Sept. 14, 1965   I. L. JOY   3,205,702

ULTRASONIC COUPLING DEVICE

Filed Dec. 30, 1963   2 Sheets-Sheet 1

INVENTOR.
Ivan L. Joy
BY
Mann, Brown & McWilliams
Attys.

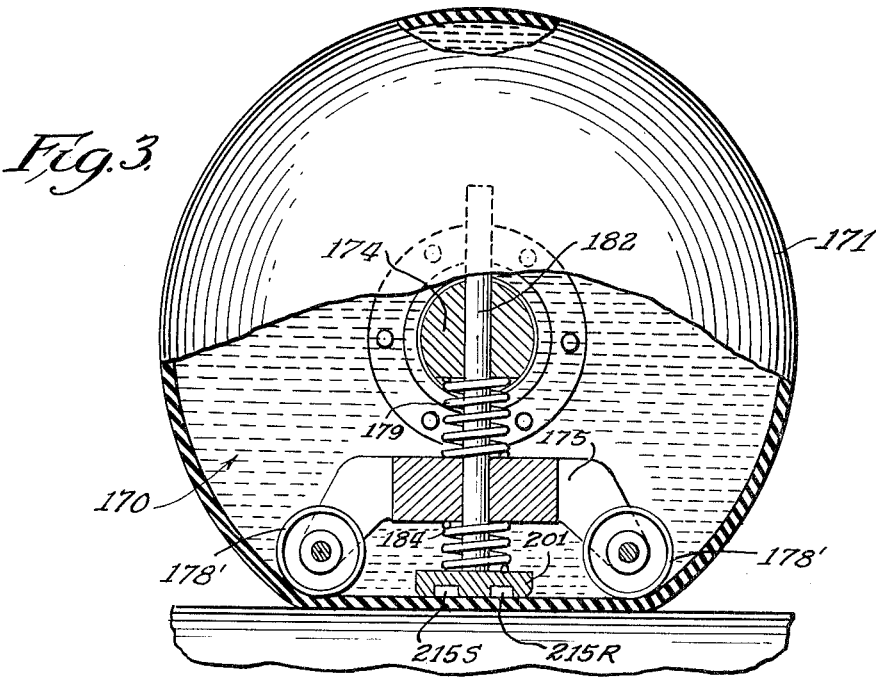
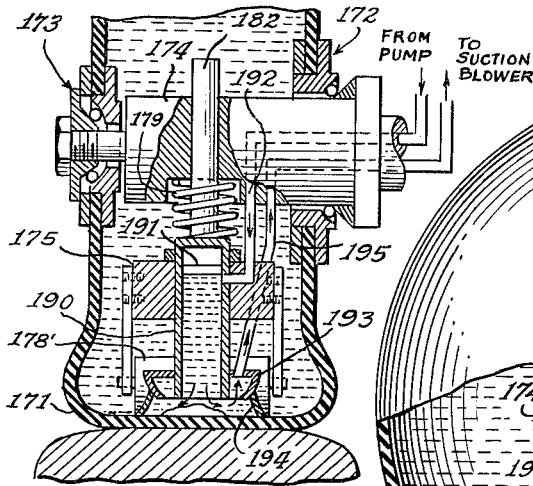
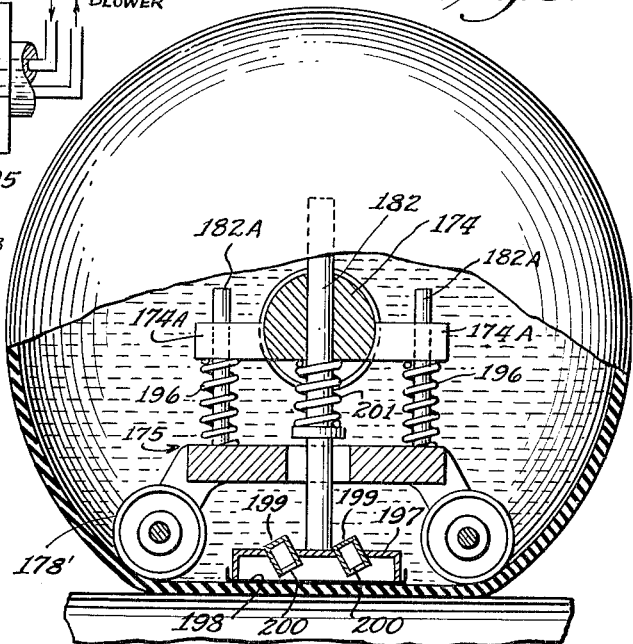

United States Patent Office 3,205,702
Patented Sept. 14, 1965

3,205,702
ULTRASONIC COUPLING DEVICE
Ivan L. Joy, Topeka, Kans., assignor to Chemetron Corporation, Chicago, Ill., a corporation of Delaware
Filed Dec. 30, 1963, Ser. No. 334,493
5 Claims. (Cl. 73—71.5)

This application is filed as a continuation-in-part of application Ser. No. 79,921 filed December 30, 1960 and as a continuation-in-part of application Ser. No. 654,941, filed April 24, 1957, which issued July 18, 1961, as U.S. Patent No. 2,992,553.

This invention relates to an ultrasonic coupling device and, more particularly, is concerned with a wheel-like coupling device for establishing rolling ultrasonic coupling along a surface of a body.

In particular, the wheel-like coupling device finds important application in progressive ultrasonic inspection of rail either as a car mounted device or as a manually maneuvered device.

The principal object of the invention is to provide a wheel-like coupling device having an internal carriage operable to maintain a portion of the periphery of the device in contact with a rail or other body under test.

Another object of the invention is to provide wheel-like elements at fore and aft spaced points on the carriage to establish rolling contact with a tire-shaped wall of the device and thereby maintain a portion of the periphery of the tire-shaped wall in flush smooth surfaced contact with the rail to facilitate the desired rolling action for the device and to insure effective ultrasonic contact during such rolling action.

Still another object of the invention is the provision of a wheel-like coupling device that is adapted to receive a variety of transducer mounting arrangements.

Other objects and advantages of the invention will become apparent during the course of the following description.

In the accompanying drawings forming a part of this specification and in which like numerals are employed to designate like parts throughout the same:

FIG. 3 is a side view partly in section and corresponds generally to FIG. 1 but illustrates an alternative transducer mounting arrangement;

FIG. 4 is a vertical sectional view illustrating a further transducer mounting arrangement internally of the wheel-line coupling device for transmitting ultrasound through a moving liquid flow column; and FIG. 5 is a further adaptation of a carriage and transducer arrangement, wherein angle crystals are provided.

Figure 1:
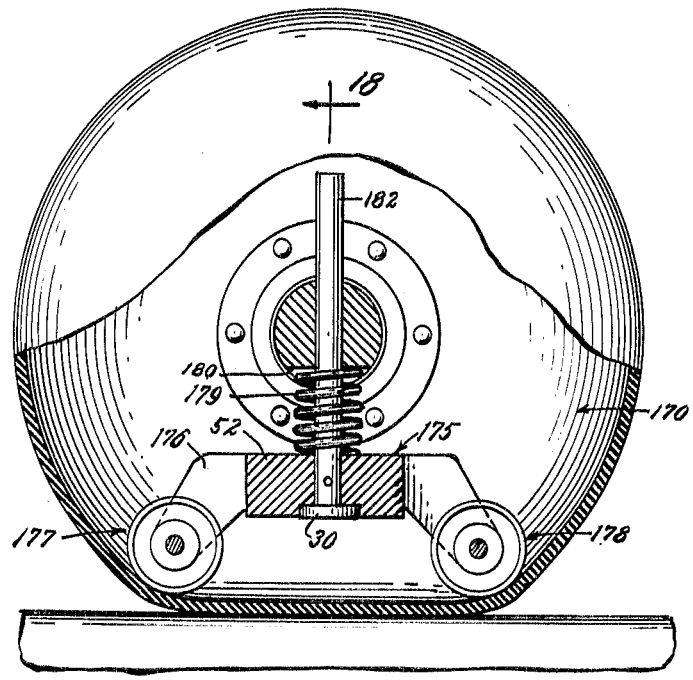
FIG. 1 is a side view, with parts broken away and sectioned, of a wheel-like ultrasonic coupling device suitable for use in ultrasonic rail testing.
Figure 2:
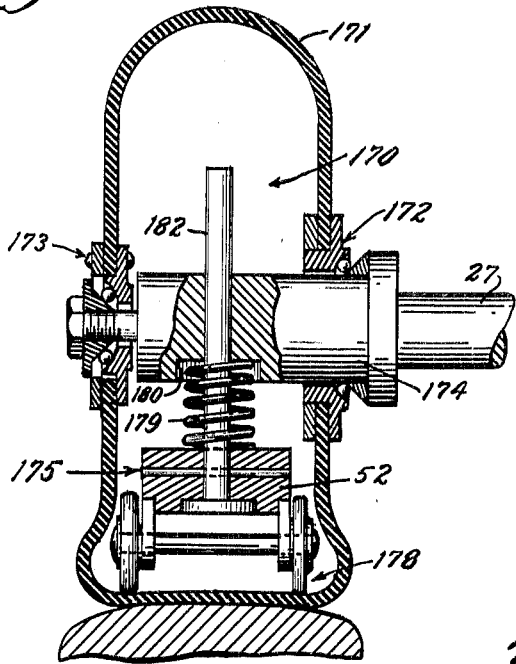
FIG. 2 is a sectional view taken on the line 2—2 of FIG. 1.

Referring now to the drawings, in FIG. 1, a wheel-like coupling apparatus is illustrated, wherein an electromechanical transducer crystal 30 is mounted within a tire-shaped chamber designated generally as 170 which is formed by a tire-shaped wall 171 of flexible material such as rubber or synthetic rubber that has inner peripheral edges on each side engaged in inner and outer bearings 172 and 173 respectively, shown carried on a support axle 174 which may be suspended from an ultrasonic rail flaw detector car of which may serve as a mount for engagement manually or otherwise to enable the coupler wheel to be rolled along a test body. Here the coupler wheel is shown in rolling relation along the running surface of a track rail R. The mounting of the bearings 172 and 173 upon the axle 174 should form a seal for the chamber 170 which is preferably substantially filled with ultrasonic coupling liquid such as ethylene glycol, though water or other liquids may be employed. Ethylene glycol avoids gas bubbles but by maintaining the tire full so that air pockets are eliminated, the problem of gas bubbles can be eliminated. Preferably, the tire is not operated under pressure due to the sealing difficulties that arise and due to the fact that undue stretching of the rubber wall 171 in the region where the ultrasound must pass through it is undesirable. While the arrangement illustrated in FIGS. 1 and 2 is preferably enclosed and isolated, it is contemplated to connect a liquid feed line through the axle structure for replenishing any liquid which may escape from the chamber 170.

The particular arrangement for mounting the tire-shaped member on the axle 174 and for effecting a seal may be varied as desired, as the present invention is concerned principally with the provision of a carriage 175, which is housed within the tire-shaped chamber 170. The subcarriage 175 comprises a rigid framework 176 that includes a holder 52 for the crystal 30 and that carries front and rear sets of wheels, 177 and 178, respectively, mounted to rotate about axes parallel to the support axle 174 and spaced fore and aft of the crystal 30. The carriage 175 and hence the wheels 177 and 178 that are carried thereon are resiliently urged towards the surface of the rail by a spring 179 that seats in a pocket 180 formed on the underneath side of the axle 174. The motion path of the spring is guided by a rod 182 that is freely slidable in a suitable bore that extends vertically through the axle 174, the rod 182 preferably being rigid with the carriage 175.

With this arrangement, the carriage 175 is continuously urged against the rail and holds a portion of the periphery of the tire-shaped wall 171 in flush smooth surfaced contact with the rail irrespective of irregularities in the rail surface or abrupt changes in the elevation such as exist at rail joints. This is accomplished even where the tire is operated in a deflated mode, and the coupling engagement is improved by reason of the weight of the coupling liquid within the chamber 170, which exerts a pressure on the wall 171 without straining the material of the wall to a point that would impair its coupling efficiency. The spring loading of the carriage accommodates all necessary movements of the carriage with respect to the axle 174; and the rolling action of the wheels 177 and 178 against the tire which maintain the ultrasonic contact at all times, minimizes wear on the tire-shaped wall 171.

An alternative internal coupling arrangement is illustrated in FIG. 3 wherein the carriage 175 is again illustrated as being loaded against the tire-shaped wall 171 by means of a coil spring 179 that reacts against the support axle 174. The carriage is fitted with wheel-like elements 178' which preferably are smooth faced rollers. The entire chamber 170 within the unit is filled with a suitable liquid to aid the wheel-like elements 178 in holding the lower portion of the periphery of the tire-shaped wall in flush, smooth, broad surfaced contact with the rail surface.

In the FIG. 3 arrangement, the guide rod 182 is movable vertically relative to the carriage and extends therebelow to provide a rigid mount for a holder block 201 which is pressed directly against the tire-shaped wall 171 by means of a coil spring 184 reacting between the block 201 and the carriage 175. The holder block 201 in this arrangement has fore and aft spaced cavities, mounting separate sender and receiver crystals 215S and 215R, respectively, which are pressed flush against the tire-shaped wall for straight vertical signal transmission. The fore and aft lower edges of the holder block are smoothly contoured to facilitate relative sliding movement between the tire-shaped wall and the crystal block 201.

A further internal crystal mounting and coupling arrangement is illustrated in FIG. 4 which is a view corresponding to that of FIG. 2 and having identical construction except that roller type wheel-like elements 178' are mounted to the carriage. In FIG. 4 the carriage 175 is shown rigidly supporting a vertically elongated holder tube 190 of generally circular cross-section which mounts a composite sender/receiver crystal 191 at its upper end and which is arranged to accommodate a solid stream of coupling liquid flowing downwardly to provide continuously a solid column of coupling liquid for transmitting vibrations between the transducer crystal 191 and the rail.

To provide the desired solid flow stream moving vertically downwardly through the holder tube 190, the tube is equipped with an inlet opening for entry of coupling liquid and located substantially at the elevation of the crystal 191 to first direct the incoming stream of coupling liquid cross-wise of the crystal for continuously sweeping it free of gas bubbles that may tend to collect on its face. Thereafter, the liquid stream flows vertically downwardly through the holder tube 190 at a rate sufficient to prevent gas bubbles from rising through the tube. The flow stream is supplied through an infeed line 192 that is brought in through the support axle 174 and is arranged to be connected to a source of liquid (not shown) through a liquid pump (not shown).

The lower end of the holder tube terminates in spaced relation to the tire-shaped wall 171 and is equipped with a ring-shaped housing 193 to define a liquid collecting chamber at the lower end of the holder tube. A rubber wiper ring 194 is shown mounted as an exterior depending skirt on the housing 193 and is disposed for wiping engagement with the tire-shaped wall 171 to create an effective seal. A liquid suction line 195 is shown connected to the liquid collecting chamber and extends through the support axle 174 for connection to an exterior suction blower (not shown).

In the arrangement of FIG. 4 the kinetic energy of the moving liquid flow stream in the holder tube 190 continuously presses the underlying portion of the tire-shaped wall 171 against the rail surface. This coupling system is workable substantially independently of the presence of liquid within the chamber 170 defined by the tire-shaped wall. It is still preferred to operate the device of FIG. 4 with the chamber 170 substantially completely filled with liquid.

Finally, another embodiment is illustrated in FIG. 5 wherein the support axle 174 is equipped with fore and aft radial arm structures 174A, each arranged to receive a vertically movable guide rod 182A that connects to the underlying portion of the carriage 175. Coil springs 196 react between the arm structures 174A of the support axle and the carriage to bias the fore and aft extremities of the carriage downwardly and provide a more distributed and stable bias to the carriage. The carriage has a central opening accommodating free movement of a guide rod 182 which is slidable through the main portion of the support axle 174 and which extends below the carriage in rigid connection to a generally rectangular box-like casing 197 that has an open bottom spanned by a flexible diaphragm 198. The diaphragm 198 may be of a plastic, such as Teflon and may have a thickness on the order of .010 inch. A pair of holders 199 are shown projecting through the roof of the casing 197 and each carries a crystal. The casing is filled with any suitable couplant such as water, ethylene glycol, or similar liquids. The casing is composed of an ultrasound absorbing material such as magnesium, lead, or bakelite and its internal surfaces are provided with a one-quarter wave length thick coating of any suitable ultrasonic wave transmitting material, so that any stray beams developing within the casing and striking the walls thereof are substantially fully transmitted through the one quarter wave length coating and then absorbed in the casing material such that the stray beams are eliminated without reflection and reverberation. Each of the crystals 200 are oriented to project on a direction axis such that the beams generated within the rail after passage through the diaphragm 198 and the tire-shaped wall 171 are on an angle of 85°.

The casing is held biased against the tire-shaped wall 171 by means of a coil spring 201 encircling the main guide rod 182. The smoothness of the Teflon diaphragm 198 facilitates free sliding movement of the tire wall 171. Since the coupling system defined within the casing 197 is sealed and is self-sufficient, it is not crucial that the tire be filled with liquid, but this is preferred, as it improves the rolling action and best maintains the broad, smooth surfaced contact of the tire-shaped wall against the rail surface.

Thus, while a preferred embodiment of the invention has been illustrated herein, it is to be understood that changes and variations may be made by those skilled in the art without departing from the spirit and scope of the appending claims.

What is claimed is:

1. An ultrasonic coupling device comprising a support axle, a housing rotatably mounted on said support axle and having a continuous wall of flexible rubber-like elastic wave transmitting material encircling said axle cylindrically for contact against a surface of a body to be inspected, means engaged to said support axle in said housing and mounting separate wheel-like elements in said housing to rotate about axes in fore and aft spaced relation to said axle to establish rolling contact with the periphery of said wall to maintain said housing in rolling contact with the surface of said body by maintaining a portion of the periphery of said wall in flush smooth faced contact with the body during relative movement of said axle along said surface, and means mounting electromechanical transducing means in said housing in elastic wave coupled relationship with a portion of said wall that is in smooth faced contact with said body.

2. A device in accordance with claim 1 and wherein said wall is tire-shaped and is substantially filled with liquid.

3. An ultrasonic coupling device comprising a support axle, a housing rotatably mounted on said support axle and having a continuous wall of flexible rubber-like elastic wave transmitting material encircling said axle cylindrically for contact against a surface of a body to be inspected, spaced apart wheel-like means disposed in said housing fore and aft of said support axle to rotate about axes parallel thereto, means mounted in said housing in elastic wave coupled relationship with said wall for emitting and receiving elastic wave signals along a direction intercepting said body intermediately of said wheel-like means, and resilient means reacting against said support axle and urging said wheel-like means into rolling contact against said wall to hold a portion of the periphery thereof that spans said wheel-like means in flush smooth faced contact with the surface of the body and thereby maintain said housing in rolling contact with the surface of said body.

4. An ultrasonic coupling device comprising a support axle, a housing rotatably mounted on said support axle and having a continuous wall of flexible rubber-like elastic wave transmitting material encircling said axle for contact against a surface of a body to be inspected, a carriage disposed in said housing and having a guide rod in radially slidable guided engagement with said support axle, spaced apart wheel-like means at locations on said carriage fore and aft of said support axle to rotate about axes parallel thereto, means in said housing guidably mounted from said carriage and disposed in elastic wave coupled relationship with said wall for emitting and receiving elastic wave signals along a direction intercepting said body intermediately of said wheel-like means to couple elastic wave signals through a portion of said wall that spans said wheel-like means, and resilient means reacting against said support axle and said carriage to urge said wheel-like means against said wall and maintain said wall in rolling contact with the surface of said body.

5. A device for maintaining an elastic wave emitting element in coupled relation to a track rail while progressing said element along successive portions of the rail and including a support axle directed generally crosswise of said rail, means for mounting said element from said support axle, a housing for said element substantially filled with elastic wave transmitting liquid and rotatably mounted on said support axle to maintain said element continuously immersed in said liquid, said housing having a continuous tire-shaped wall of flexible elastic wave transmitting rubber-like material for rolling contact with said rail, wheel-like means disposed in said housing fore and aft of said element, and resilient means reacting against said support axle to urge said wheel-like means against said wall and maintain a portion of the periphery thereon in contact with said rail to transmit elastic waves between said emitter and said rail through said wall.

References Cited by the Examiner

UNITED STATES PATENTS

| 2,545,101 | 3/51 | Meunier | 310—8.7 |
| 2,678,559 | 5/54 | Drake | 73—67.8 |
| 2,836,059 | 5/58 | Beaujard et al. | 73—67.8 |
| 3,028,753 | 4/62 | Joy | 73—67.8 |

FOREIGN PATENTS

| 726,824 | 3/55 | Great Britain. |

RICHARD C. QUEISSER, *Primary Examiner.*